Oct. 2, 1928.

F. W. BAKER 1,685,974

TWO-RIM VEHICLE WHEEL

Filed Aug. 25, 1926 — 2 Sheets-Sheet 1

Inventor,
Frederick William Baker
By his Attorney,
Ramsay Hoguet.

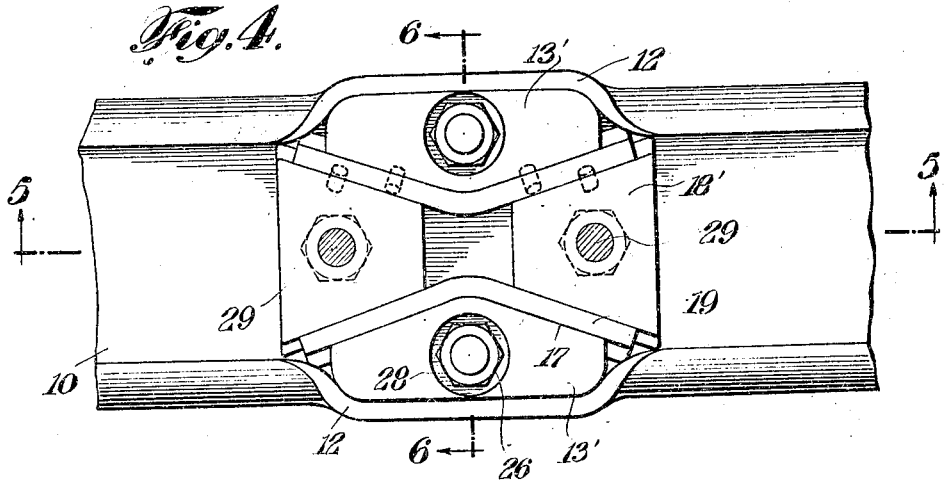
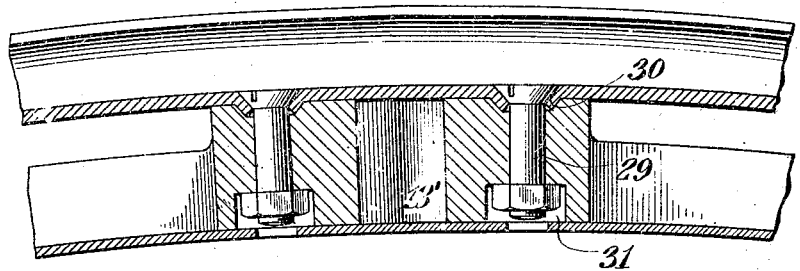
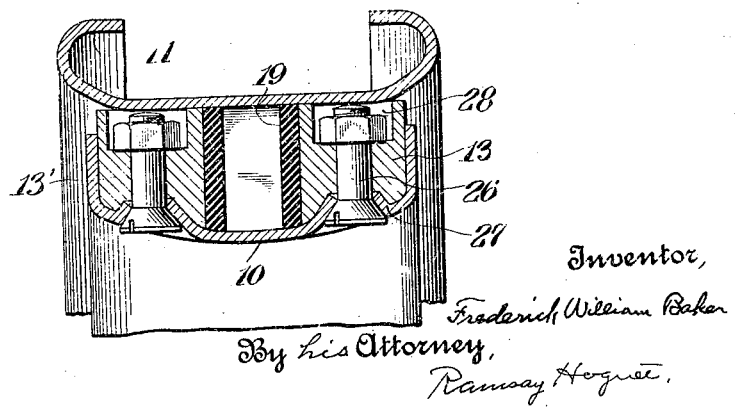

Patented Oct. 2, 1928.

1,685,974

UNITED STATES PATENT OFFICE.

FREDERICK WILLIAM BAKER, OF STOURBRIDGE, ENGLAND, ASSIGNOR TO TRINITY WHEEL CORPORATION, OF NEW YORK, N. Y., A CORPORATION OF NEW YORK.

TWO-RIM VEHICLE WHEEL.

Application filed August 25, 1926. Serial No. 131,509.

My invention relates to improvements in vehicle wheels, particularly wheels for motor cars having inner and outer rims spaced apart and with bearing members connecting the rims at spaced intervals. In wheels of this character the outer rim is driven from the inner rim, and my invention is intended to provide a driving connection between the two rims which comprises a series of bearing members serving to space the rims and which includes a yielding part so as to relieve the drive from too much rigidity, and to cushion the outer rim to a limited extent radially and laterally, but more especially to ease the torsional strain. In wheels of this character it is essential that the connecting members between the rims be very strongly attached or otherwise they will tear loose. It is also essential that a part of each connecting bearing member be attached to one rim and a part to the other, to the end that the yielding packing may be placed between the connecting members and absorb a certain amount but not too much of the strain. My invention embodies a means for carrying out the above construction. Because of the strain on the parts, I provide bearing members and connectors which are mostly of metal to the end that they may be firmly attached to the respective rims, but in order to avoid the metal to metal connections and provide for a limited yielding in all directions, I include a resilient packing preferably of textile fabric, but of any suitable material, which is interposed between the metallic parts, and in a way to absorb the shock of the drive.

Obviously if there is too much resilience in the driving connection the result is lost motion and instability, but in my invention I avoid this difficulty by providing for firm rim connections and by disposing the yielding packing in a way which will give the necessary but not too much resilience. Another object of my invention is to provide this yielding driving and spacing connection between the rims in such a way that the outer rim may if desired be demountable.

These and other advantages will be better understood from the description which follows.

Reference is to be had to the accompanying drawings forming a part of this invention, in which similar reference characters indicate corresponding parts in all the views.

Figure 4 is a fragmentary plan view partly in section of a slightly modified connector which is not demountable.

Figure 5 is a section on the line 5—5 of Figure 4, and

Figure 6 is a cross section on the line 6—6 of Figure 4.

Figure 1:
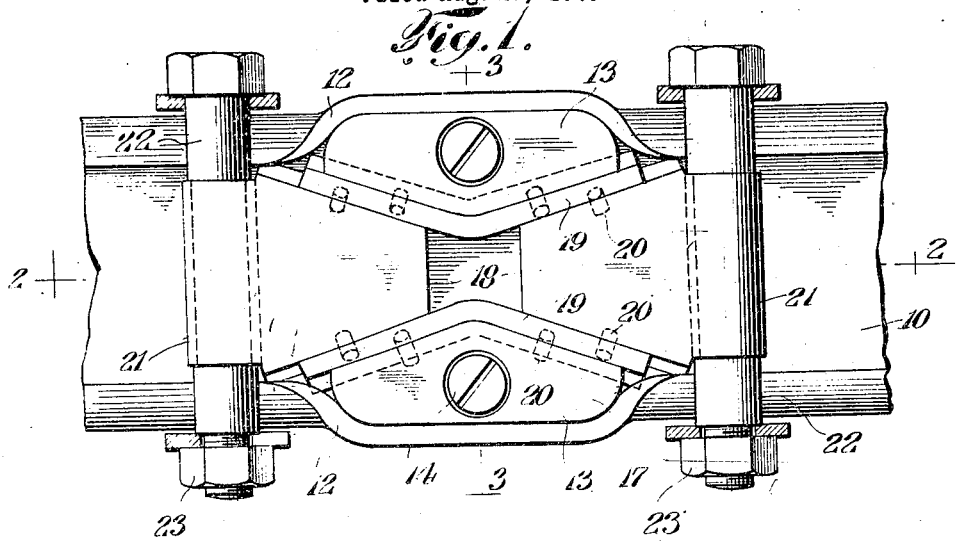
Figure 1 is a fragmentary plan view partly in section of one of the bearing and connecting members embodying my invention.
Figure 2:
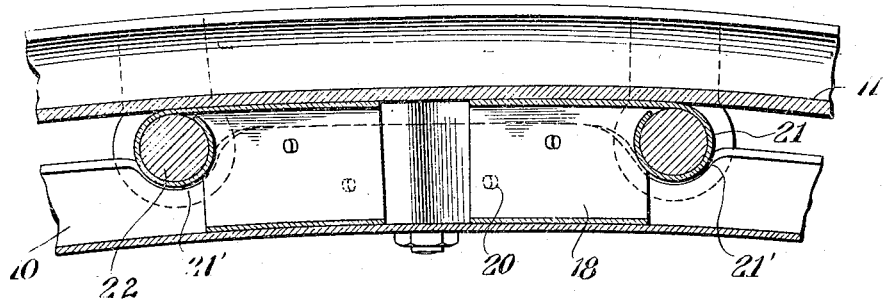
Figure 2 is a section on the line 2—2 of Figure 1.
Figure 3:
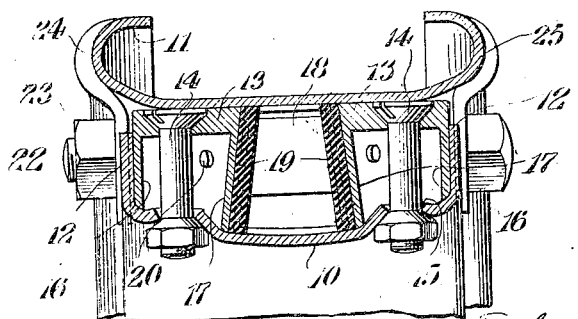
Figure 3 is a cross section on the line 3—3 of Figure 1.

The wheel can have any desired or approved spoke system, and my invention lies in the connection between the inner rim 10 and the outer rim 11. The rims themselves may likewise be of any preferred type, the important thing being that they are concentric. Where the connection between the rims is to be made the inner rim 10 is preferably provided with a seat 12 which receives the opposed abutments 13, these being preferably metallic blocks fitting in the outer sides of the seats, and thus the walls of the seat take the greater part of the strain, and the fastening bolts 14 serve principally to hold the blocks 13 in place. Any suitable bolts 14 can be used, and I have shown screw bolts, the nuts of which fit in seats 15 formed on the inner side of the inner rim to receive them. The blocks 13 are preferably made hollow for lightness, and the outer walls 16 are shaped to fit against the walls of the seats 12, while the inner walls 17 are flared from the central part of the blocks or abutments 13 in both directions forming double wedging ways between them, as shown clearly in Figure 1. The walls 17 are also inclined as shown in Figure 3, so as to be wider at the inner edges than at the outer edges, thus forming a dovetail as well as a wedging connection with the blocks or abutments 18 which are secured to the outer rim.

Thus it will be seen that if strain is applied in either direction to the inner rim, the abutments 13 will be forced with a wedging action upon one of the blocks 18, and the blocks or abutments 18 cannot readily be displaced. It would be undesirable to have the metal blocks 13 and 18 in contact, and it would not achieve the resilient or yielding drive which I desire. Therefore I place yielding packing 19 between the members 18 and 13, and this packing can be textile fabric, rubberized fabric, or any tough yielding material. The packing can be held in place by screws or pins 20. It will be seen, therefore, that with the packing in place, the strain imparted from the members 13 to one member 18, and thence to the outer rim, is through the packings 19, and as these yield, the strain will be in part absorbed, and at any rate will be an easy drive free from shocks or jolts. On the other hand the yielding is very limited and does not make an unstable connection.

I do not limit the invention to any particular connection between the members 18 and the outer rim 11, but I have shown a preferred and convenient way of demountably making this connection, in which the members 18 are provided at the ends of the connectors with sleeves 21 through which extend fastening bolts 22, these being long enough to extend across the rim and the inner rim can have sockets 21' to receive the bolts. The bolts are provided with nuts 23, and each bolt carries a pair of clips 24 and 25 shaped to embrace the sides of the outer rim. One pair of clips 25, for example, can be brazed or otherwise fastened to the rim, and when the nuts are removed from the bolts, the loose clips 24 can be slipped off and the rim, clips 25, and bolts pulled off axially from the wheel. This makes a convenient and substantial demountable connection, but other means of connecting the resilient driving member with the outer rim can be employed without affecting the invention.

In Figures 4 to 6 I have shown a simpler form of the invention in which the outer rim is demountable but in which the same principle is employed. As here illustrated the blocks 13' are arranged substantially as already indicated, being fastened by screw bolts 26 and recessed on top or on the outer side as shown at 28 to receive the fastening nuts. The members 18' corresponding to the members 18 already described, are rigidly attached by screw bolts 29 to the outer rim, and are recessed as at 30 to receive countersunk parts of the outer rim as shown in Figure 5 and also recessed as at 31 to receive the nuts for the bolts 29. In this form of construction the packing pieces 19 are disposed as already described.

Thus it will be seen that in a very simple manner I have provided a strong connection between the two rims, in which the abutments 13—13' are rigidly secured to the inner rim, the abutments 18—18' firmly connected to the outer rim, and yet there is a resilient connection between the two sets of abutments. It will further be noted that the disposition of the packings 19 is such that a slight cushioning effect is had laterally as well as torsionally.

I claim:

1. A vehicle wheel having spaced concentric rims, spaced abutments with oppositely inclined sides on one rim, abutments on the second rim wedging between those of the first rim and removably coupled to said second rim, and a yielding packing between the wedging abutments.

2. A vehicle wheel having concentric rims, spaced abutments with inclined walls shaped to form a way between said abutments wedging from the ends towards the center portion on one rim, shaped abutments on the second rim fitting in the way formed between the first abutments, and a yielding packing between the abutments.

3. A vehicle wheel having spaced rims, opposed abutments seated on the inner rim having their opposite faces flaring from the middle portion to form wedging ways between them, spaced abutments on the outer rim shaped to wedge in the ways of the inner rim, yielding packings between the two sets of abutments, clips on the outer rim, and detachable fastenings connecting said clips with the abutments of the outer rim.

4. A vehicle wheel having spaced concentric rims, a pair of spaced wedge-shaped abutments disposed circumferentially on one of said rims, a pair of spaced wedge-shaped abutments disposed transversely opposite each other on the other of said rims and adapted to cooperate with said first mentioned abutments, and a yielding packing between said abutments.

5. A vehicle wheel having spaced concentric rims, a pair of opposite spaced abutments on one of said rims, a pair of opposite spaced abutments on the other of said rims and adapted to cooperate with the abutments on said first mentioned rim, the sides of said abutments being inclined circumferentially and radially with respect to said rims, and a yielding packing between said abutments.

In testimony whereof, I have signed my name to this specification this 19th day of August, 1926.

FREDERICK WILLIAM BAKER.